US005574560A

United States Patent [19]
Franz et al.

[11] Patent Number: 5,574,560
[45] Date of Patent: Nov. 12, 1996

[54] DUAL-BEAM INTERFEROMETER WITH A PHASE GRATING

[75] Inventors: Andreas Franz, Trostberg; Erwin Spanner, Traunstein, both of Germany

[73] Assignee: Dr. Johannes Heidenhain GmbH, Traunreut, Germany

[21] Appl. No.: 393,700

[22] Filed: Feb. 24, 1995

[30] Foreign Application Priority Data

Feb. 26, 1994 [EP] European Pat. Off. ............... 94102938

[51] Int. Cl.⁶ .................................................. G01B 9/02
[52] U.S. Cl. .......................... 356/358; 356/354; 356/356
[58] Field of Search ................................. 356/358, 345, 356/354, 356; 250/237 G

[56] References Cited

U.S. PATENT DOCUMENTS

| | | |
|---|---|---|
| 3,090,279 | 5/1963 | Chisholm . |
| 3,547,544 | 12/1970 | Steinemann et al. . |
| 3,614,235 | 10/1971 | Munnerlyn . |
| 4,027,976 | 6/1977 | Amon .................................. 356/358 |
| 5,120,132 | 6/1992 | Spies et al. .......................... 356/356 |

FOREIGN PATENT DOCUMENTS

| | | |
|---|---|---|
| 4018664A1 | 6/1990 | Germany . |
| 4028051A1 | 9/1990 | Germany . |

*Primary Examiner*—Samuel A. Turner
*Assistant Examiner*—Amanda Merlino
*Attorney, Agent, or Firm*—Brinks Hofer Gilson & Lione

[57] ABSTRACT

An interferometer having a light source that generates a beam of light. The beam of light is directed to a beam splitter where it is split into a reference beam and a measuring beam. A pair of reflectors reflect the reference and measuring beams towards an interference point. A beam merging element is positioned at the interference point so that the reference and measuring beams interfere with each other at the interference point so that at least two pairs of partial beams which are phase-shifted in relation to each other and interfere with one another are generated. The two pairs of partial beams are received by a plurality of detectors which form directionally dependent measured values.

30 Claims, 3 Drawing Sheets

DUAL-BEAM INTERFEROMETER WITH A PHASE GRATING

Applicants claim, under 35 U.S.C. §119, the benefit of priority of the filing date of Feb. 26, 1994, of a European application, copy attached, Ser. No. 94102938.1, filed on the aforementioned date, the entire contents of which are incorporated herein by reference.

FIELD OF THE INVENTION

The invention relates to an interferometer, such as a Michelson interferometer, with a reference beam path and measuring beam path, which are generated by a beam splitter from a coherent beam and are returned by reflectors to a beam merging element, are made to interfere by the beam merging element and are detected by detectors.

BACKGROUND OF THE INVENTION

Devices of this type are used for the interferential measurement of lengths, angles, path differences or velocities with the aid of a dual-beam interference arrangement.

In dual-beam interferometers corresponding to such arrangements like Michelson interferometers, Mach-Zehnder interferometers or the like, the phase or path difference change between the two partial beams connected with the respective measurement process does not yet provide any information regarding the sign of these phase or path difference changes or the sign of the speed of change. This information can be additionally obtained by means of various known methods and devices and evaluated by means of known measuring techniques. The underlying principle of these measuring techniques is that phase-shifted, interlinked sinusoidal signal pairs, such as those derived from interference phenomena, permit a directional discrimination.

The properties of the known interferometers with which such signal evaluations are performed are unsatisfactory for several reasons, depending on their application. Portions of light which return from the interferometer to the laser light source interfere with some of the instruments. With other apparatus it is virtually impossible or only possible with a great amount of effort to generate any modulation periods which have mutual prescribed phase differences. When generating signals which are phase-shifted with respect to each other, simple methods are lacking for simultaneously obtaining optical push-pull signals which stabilize the operating points of the signal amplifiers.

Interferometers as described above usually are constructed as follows: besides a beam splitter and two retroreflectors, a number of optically polarizing components are required for the generation of useful phase-shifted signals (0°, 90°, 180°, 270°) and to make a determination of direction possible in this way. The optically polarizing components are large, expensive and their adjustment is elaborate.

With the above-description of prior art interferometers in mind it is an object of the present invention to create a device for interferential measurements of any arbitrary type whose measuring techniques are satisfactory and which is designed in a particularly simple manner.

Another object of the present invention is to simplify the construction of interferometers by combining the functions of beam splitting and interferentially combining beams in one element.

SUMMARY OF THE INVENTION

The present invention concerns an interferometer having a light source that generates a beam of light. The beam of light is directed to a beam splitter where it is split into a reference beam and a measuring beam. A pair of reflectors reflect the reference and measuring beams towards an interference point. A beam merging element is positioned at the interference point so that the reference and measuring beams interfere with each other at the interference point so that at least two pairs of partial beams which are phase-shifted in relation to each other and interfere with one another are generated. The two pairs of partial beams are received by a plurality of detectors which form directionally dependent measured values.

An advantage of the present invention is to create an interferometer which is simple in design.

Another advantage of the present invention is that it simplifies interferometers by combining the functions of beam splitting and interferentially combining beams in one element.

Another advantage of the present invention is that the signal evaluation is realized by means of a special grating component. In the process, three detector signals (0°, 120°, 240°) are generated, which are respectively displaced by 120° with respect to each other and allow the determination of the direction of the mirror displacement.

The invention is described in detail hereinafter, in conjunction with the schematic drawings.

DESCRIPTION OF THE PREFERRED EMBODIMENT

Figure 1:
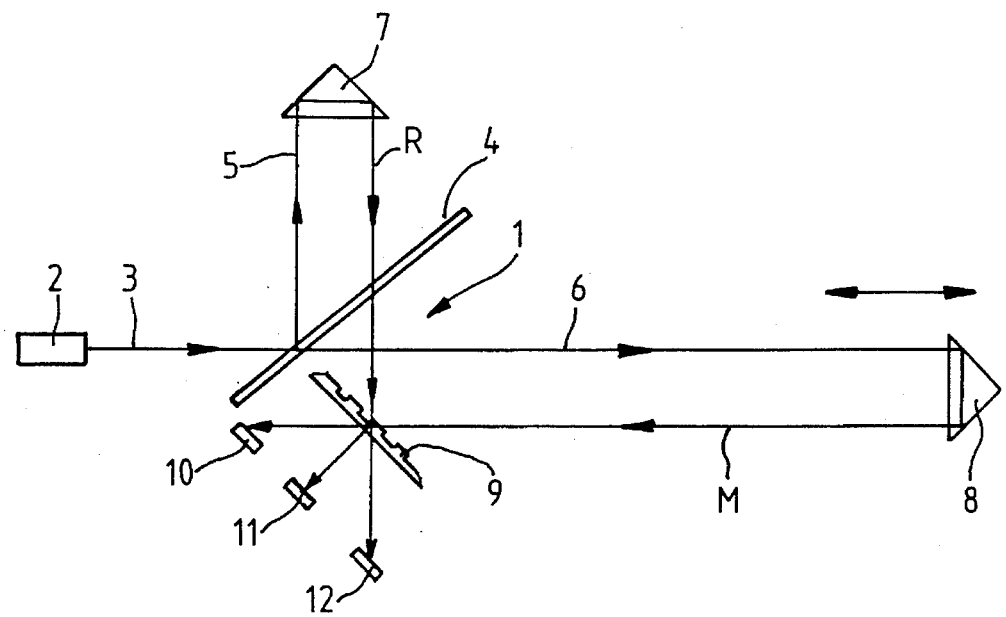
FIG. 1 schematically shows a first embodiment of a grating arrangement to be used with a Michelson interferometer according to the present invention.

The basic design of a Michelson interferometer 1 is illustrated in FIG. 1. The interferometer has a laser as the light source 2 which generates a coherent light beam 3. The light beam 3 intersects a beam splitter 4 which splits light beam 3 into a reference light beam 5 and a measuring light beam 6. In this case, the reference light beam 5 constitutes the reference branch R and the measuring beam 6 constitutes the measuring branch M.

Both the reference light beam 5 and the measuring light beam 6 pass through a reflector respectively associated with them, such as triple mirrors 7 and 8. The reference light beam 5 (R) and measuring light beam 6 (M) are reflected by the triple mirrors 7 and 8, respectively, and then impact a beam merging element, such as diffraction grating 9, at a common interference point where the grating 9 is positioned.

The incoming reference light beam 5 (R) and measuring light beam 6 (M) are respectively diffracted at the diffraction grating 9 into different orders for each beam 5, 6, for example into the 0th, 1st and 2nd orders. Accordingly, three pairs of partial beams are formed in three resultant directions which are phase shifted in relation to each other and interfere with each other. In the process, intensity modulations result, which are phase-shifted with respect to each other and which are received by three detectors 10, 11, 12 and changed in a known manner into electrical signals which are phase-shifted with respect to each other and which have directionally dependent measured values.

The size, degree of modulation and phase position of the three signals in relation to each other are determined by means of the special design of the diffraction grating 9 which has a plurality of ridges, each ridge defining a ridge height and a ridge width. By determining one or more parameters of the grating 9, such as the grating constant, ridge height and ridge width, the pairs of partial beams are phase-shifted in relation to each other and so the size, degree of modulation and phase position of the signals no longer need to be optimized by adjustment.

So that the partial beams of the 0th, 1st and 2nd orders that are diffracted out of the reference light beam 5 (R) and measuring light beam 6 (M) can respectively be overlaid in pairs and interfere with each other, the incident angles of the light beams 5 (R) and 6 (M) on the grating 9, the wavelength of the light used and the grating constant of the phase grating 9 must be matched to each other.

Figure 2:
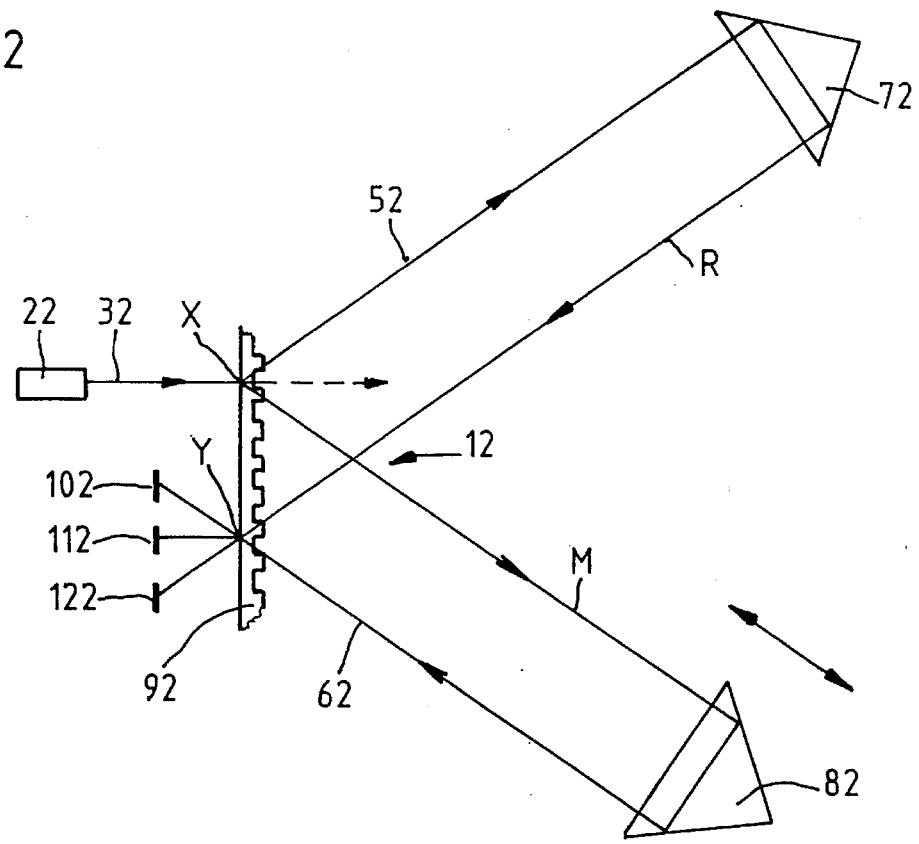
FIG. 2 schematically shows a second embodiment of a grating arrangement to be used with a Michelson interferometer according to the present invention.

This requirement results in the particularly advantageous embodiment of the interferometer 12 of FIG. 2. Here, the particular advantage lies in that one phase grating 92 serves as both a beam splitter and a beam merging element. As seen in FIG. 2, light source 22 generates a light beam 32 which intersects grating 92 at a beam splitting location X where the light is split and directed towards a pair of reflectors, such as triple mirrors 72 and 82. Following reflection at the triple mirrors 72 and 82, the reference light beam 52 (R) and the measuring light beam 62 (M) impact the diffraction grating inevitably at exactly correct angles so that they are diffracted at an intersection point Y where the diffraction grating 92 is positioned. The beam splitting location X is separate from the interference point Y. The diffracted partial beams from grating 92 interfere with each other in pairs. Three detectors 102, 112, 122 convert the interfering pairs of beams into electrical signals which have a mutual phase shift of respectively 120°.

The preferred embodiment of FIG. 2 has a minimum of components, so that the adjustment effort is also minimized. Only a light source 22, a phase grating 92, two reflectors 72, 82 and three detectors 102, 112, 122 are functionally required for such an interferometer 12.

In this case it is advantageous if the phase grating 92 has the same grating constant at the beam splitting location X as at the interference point Y, but has a different ridge height and/or ridge width in order to diffract the smallest possible amount of light into unused orders.

Figure 3:
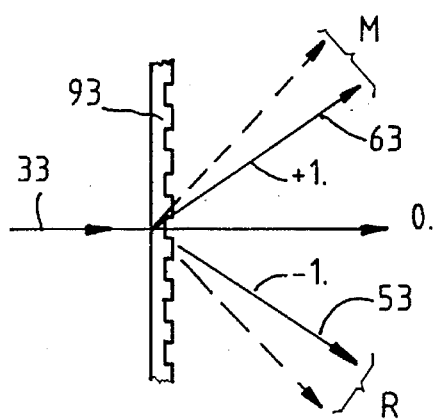
FIG. 3 schematically shows the sensitivity of the interferometers of FIGS. 1 and 2.

As illustrated in FIG. 3, interferometers of the type shown in FIGS. 1 and 2 are sensitive to changes in the grating constant and/or wavelength. An increase in the wavelength results in an increase of the diffraction angles (dashed lines in FIG. 3), for example. Although this has no bearing on the phase evaluation itself, this would cause a change in the measuring direction or, with a fixedly set direction, in the measured length as a function of the cosine. For this reason it is necessary to keep the wavelength, as well as the grating constant of the grating 93, constant (for example by the use of a reference interferometer and a readjustment of the laser frequency and by producing the graying from materials with low thermal expansion coefficients, such as quartz or a material with the commercial name Zerodur). If for whatever reasons these parameters cannot be maintained constant, for example because the wavelength is to be deliberately varied for absolute measurements of the wavelength, the problem can be resolved by the embodiment of the grating shown in FIG. 4.

Figure 4:
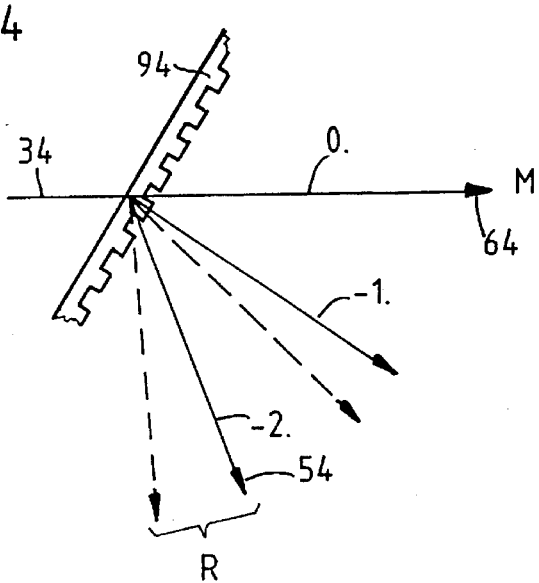
FIG. 4 schematically shows a third embodiment of a grating arrangement to be used with a Michelson interferometer where the light beam impacts obliquely on the grating according to the present invention.

As shown in FIG. 4, in place of the interferometers of FIGS. 1 and 2 which illuminate the splitting grating vertically and of utilizing the ±1st diffraction orders, it is possible to let the laser beam impact obliquely on the grating 94 and use the 0th and −2nd diffraction orders. The direction of the 0th diffraction order entering the measuring branch M is independent of the grating constant and the wavelength and therefore does not change direction. The direction of the −2nd diffraction order which feeds the reference branch R changes but, since in general the reference branch R is short, the change of the length of the reference branch R connected therewith is of no consequence.

Figure 5:
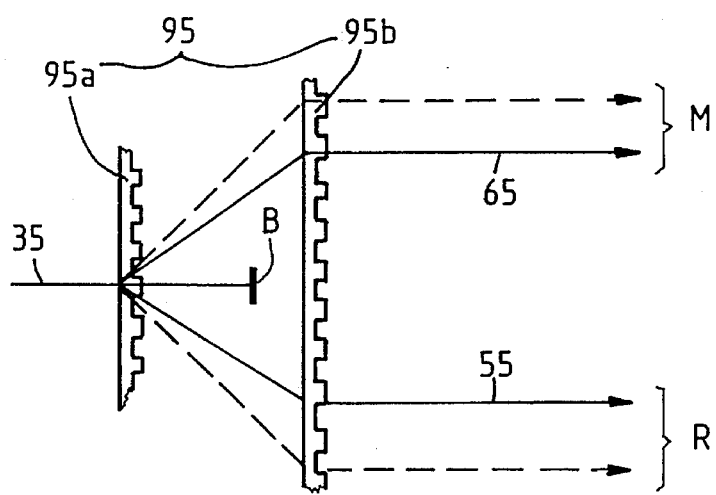
FIG. 5 shows a fourth embodiment of a grating arrangement to be used with a Michelson interferometer according to the present invention.

A grating detail is represented in FIG. 5, wherein the influence of the previously mentioned type which cause errors in general can no longer have negative effects. This is achieved for the price of a negligible increased outlay of a second grating 95b, which is identical with the first grating 95a with respect to its grating parameters and is disposed parallel with it. This grating arrangement can be identified as an achromatic grating element 95, which also consists of the above-described grating 95a and wherein the second grating 95b can also consist of a grating with the identical grating constant, but different ridge height and ridge width. When changing the grating constant, the beams 55, 65 are only displaced in a parallel manner (dashed lines), which has no effect at all on the measurement and the measuring accuracy. In both embodiments of the grating system shown in FIG. 5, the zeroth (0th) order can be blanked out by a screen B and the gratings 95a and 95b can be rigidly connected to each other.

Figure 6:
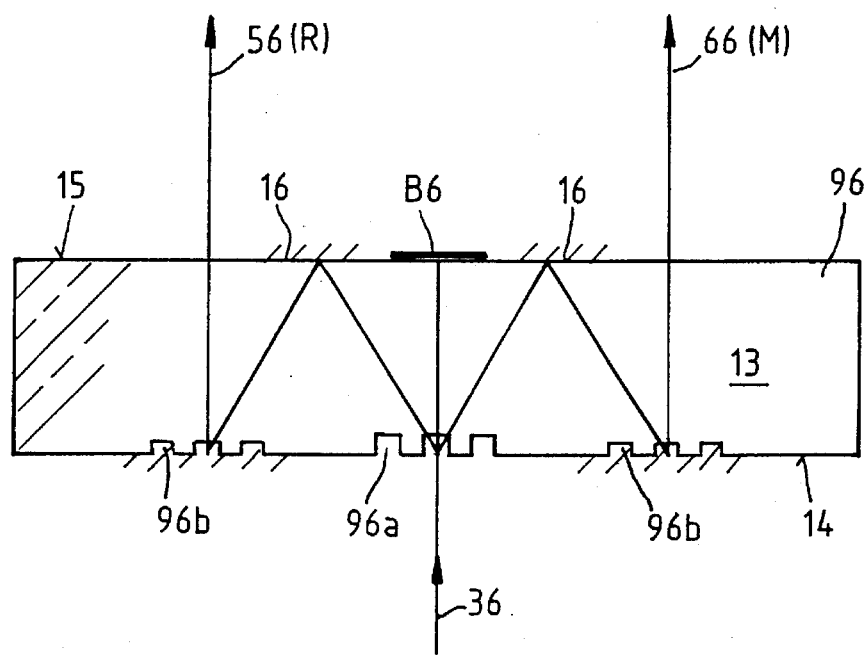
FIG. 6 shows a fifth embodiment of a grating arrangement to be used with a Michelson interferometer according to the present invention.

A grating element 96 is illustrated in FIG. 6. The grating element 96 is formed from a substrate 13 that defines a pair of parallel planes or surfaces 14, 15. The first plane 14 has a partial grating 96a to receive the beam of light 36 from source 2. Partial grating 96a then splits the beam of light into a reference beam 56 and a measuring beam 66 which propagate towards the second plane 15. The split reference beam 56 and measuring beam 66 preferably are + or −1st order partial beams. The second plane 15 has a pair of reflection areas 16 which are mirror coated due to vapor deposition. The reflection areas receive and reflect the reference and measuring beams 56 and 66 towards the first plane 14. The reflected beams then are received by a pair of partial gratings 96b which are arranged in plane 14. Gratings 96b then diffract the reference beam 56 and measuring beam 66 toward plane 15 so that they exit from the substrate 13 essentially parallel to the incoming beam 36 as reference branch R and measuring branch M. As before, the reference beam 56 and measuring beam 66 propagate towards mirrors 7 and 8.

Figure 7:
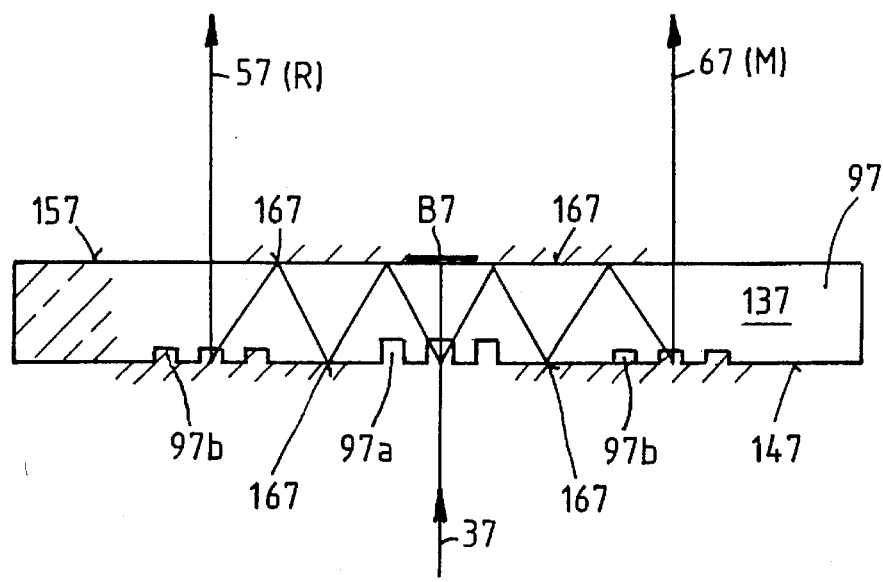
FIG. 7 shows a sixth embodiment of a grating arrangement to be used with a Michelson interferometer according to the present invention.

A variation of the arrangement of FIG. 6 is shown in FIG. 7, where the reference beam 57 and measuring beam 67 can also be multiply reflected by means of appropriately placing mirror-coated (via vapor deposition) on a plurality of partial areas 167 on the surfaces 147 and 157 of the substrate 137.

In both of the embodiments of FIGS. 6 and 7, it is also possible to blank out the 0th order partial beam by screens B6 and B7. Furthermore, by means of the above-described embodiments shown in FIGS. 6 and 7 it is possible to reduce the structural length of the grating element by at least half, depending on the number of reflections.

The invention may be embodied in other forms than those specifically disclosed herein without departing from its spirit or essential characteristics. For example, it is understood that the grating elements shown in FIGS. 1–7 may be used in either the Michelson interferometer shown in FIGS. 1–2. The described embodiments are to be considered in all respects only as illustrative and not restrictive, and the scope of the invention is commensurate with the appended claims rather than the foregoing description.

We claim:

1. An interferometer comprising:
   a light source generating a beam of light;
   a stationary beam splitter splitting said beam of light into a reference beam and a measuring beam;
   a first reflector reflecting said reference beam towards an interference point;
   a second movable reflector reflecting said measuring beam towards said interference point;
   a beam merging element positioned at said interference point so that said reference beam and said measuring beam interfere with each other at said interference point so that at least two pairs of partial beams which are phase-shifted in relation to each other and interfere with one another are generated wherein said beam merging element comprises a phase grating having a plurality of ridges, each ridge defining a ridge height and a ridge width; and
   a plurality of detectors to receive said at least two pairs of partial beams and form directionally dependent measured values.

2. The interferometer of claim 1, wherein one or more grating parameters of said phase grating are determined so that said at least two pairs of partial beams are phase-shifted in relation to each other and interfere with one another.

3. The interferometer of claim 2, wherein said one or more grating parameters comprises the grating constant of said phase grating.

4. The interferometer of claim 2, wherein said one or more grating parameters comprises the ridge height of said phase grating.

5. The interferometer of claim 2, wherein said one or more grating parameters comprises the ridge width of said phase grating.

6. The interferometer of claim 1, wherein said beam splitter and said beam merging element are embodied in the same element.

7. The interferometer of claim 6, wherein said beam splitter and said beam merging element are a phase grating having a plurality of ridges, each ridge defining a ridge height and a ridge width.

8. The interferometer of claim 1, wherein said beam of light intersects said phase grating at a beam splitting location that is separate from said interference point.

9. The interferometer of claim 7, wherein said beam of light intersects said phase grating at a beam splitting location that is separate from said interference point.

10. The interferometer of claim 1, wherein said phase grating has a constant grating constant, but different ridge heights and/or ridge widths at the beam splitting location as well as at the interference point.

11. The interferometer of claim 7, wherein said phase grating has a constant grating constant, but different ridge heights and/or ridge widths at the beam splitting location as well as at the interference point.

12. The interferometer of claim 1, wherein said phase grating comprises two phase gratings disposed parallel to each other and having identical grating parameters.

13. The interferometer of claim 7, wherein said phase grating comprises two phase gratings disposed parallel to each other and having identical grating parameters.

14. The interferometer of claim 1, wherein said two phase gratings are disposed parallel to each other and have identical grating constants, but different ridge heights and ridge widths.

15. The interferometer of claim 7, wherein said two phase gratings are disposed parallel to each other and have identical grating constants, but different ridge heights and ridge widths.

16. The interferometer of claim 12, wherein said two parallel phase gratings are rigidly connected to each other.

17. The interferometer of claim 13, wherein said two parallel phase gratings are rigidly connected to each other.

18. The interferometer of claim 14, wherein said two parallel phase gratings are rigidly connected to each other.

19. The interferometer of claim 15, wherein said two parallel phase gratings are rigidly connected to each other.

20. The interferometer of claim 1, wherein said beam splitter comprises a substrate defining a first plane and a second plane parallel to said first plane, wherein said first plane comprises a partial grating to receive said beam of light and split said beam of light into said reference and measuring beams which propagate towards said second plane;

said second plane comprising a plurality of reflection areas to receive and reflect said reference and measuring beams towards said first plane;

said first plane further comprising a second partial grating to receive said reference beam from said second plane and diffract said reference beam toward said second plane; and said first plane further comprising a third partial grating to receive said measuring beam from said second plane and diffract said measuring beam toward said second plane.

21. The interferometer of claim 1, wherein said phase grating comprises a substrate defining a first plane and a second plane parallel to said first plane, wherein said first plane comprises a partial grating to receive said beam of light and split said beam of light into said reference and measuring beams which propagate towards said second plane;

said second plane comprising a plurality of reflection areas to receive and reflect said reference and measuring beams towards said first plane;

said first plane further comprising a second partial grating to receive said reference beam from said second plane and diffract said reference beam toward said second plane; and said first plane further comprising a third partial grating to receive said measuring beam from said second plane and diffract said measuring beam toward said second plane.

22. The interferometer of claim 7, wherein said phase grating comprises a substrate defining a first plane and a second plane parallel to said first plane, wherein said first plane comprises a partial grating to receive said beam of light and split said beam of light into said reference and measuring beams which propagate towards said second plane;

said second plane comprising a plurality of reflection areas to receive and reflect said reference and measuring beams towards said first plane;

said first plane further comprising a second partial grating to receive said reference beam from said second plane and diffract said reference beam toward said second plane; and said first plane further comprising a third partial grating to receive said measuring beam from said second plane and diffract said measuring beam toward said second plane.

23. The interferometer of claim 20, wherein said reference beam and the measuring beam split from said first partial grating are partial beams of the ±1st order;

said reference and measuring beams reflecting off the first plane are oriented parallel to the direction of said beam of light;

said reference beam reflected off the first plane exits out of the substrate toward said first mirror; and said measuring beam reflected off the first plane exits out of the substrate toward said second mirror.

24. The interferometer of claim 21, wherein said reference beam and the measuring beam split from said first partial grating are partial beams of the ±1st order;

said reference and measuring beams reflecting off the first plane are oriented parallel to the direction of said beam of light;

said reference beam reflected off the first plane exits out of the substrate toward said first mirror; and said measuring beam reflected off the first plane exits out of the substrate toward said second mirror.

25. The interferometer of claim 23, wherein said reference and measuring beams each reflect off of said first surface a multiple number of times before exiting said substrate.

26. The interferometer of claim 24, wherein said reference and measuring beams each reflect off of said first surface a multiple number of times before exiting said substrate.

27. The interferometer of claim 23, wherein said first, second and third partial gratings have identical grating parameters.

28. The interferometer of claim 24, wherein said first, second and third partial gratings have identical grating parameters.

29. The interferometer of claim 23, wherein said first, second and third partial gratings have identical grating constants, but different ridge heights and ridge widths.

30. The interferometer of claim 24, wherein said first, second and third partial gratings have identical grating constants, but different ridge heights and ridge widths.

* * * * *